Patented May 14, 1935

2,001,211

UNITED STATES PATENT OFFICE 2,001,211

PRODUCTION OF FATTY ACID ANHYDRIDES

Richard Müller, Heidelberg, and Erich Rabald, Mannheim, Germany, assignors to C. F. Boehringer & Saehne G. m. b. H., Mannheim-Waldhof, Germany No Drawing. Application December 10, 1932, Serial No. 646,706. In Germany December 21, 1931

8 Claims. (Cl. 260—123)

Our invention relates to the production of fatty acid anhydrides, such as acetic acid anhydride, propionic acid anhydride etc. and one of its objects is to produce these compounds from ethylidene diacetate, dipropionate etc. in a particularly simple and efficient manner.

Acetic acid anhydride has hitherto been produced from ethylidene diacetate in various manners. Either liquid ethylidene diacetate has been decomposed at an elevated temperature in the presence of catalysts or the catalytic decomposition of the ethylidene diacetate has been effected in the vapor phase.

It is well known to those skilled in the art that if the process is carried out in the liquid phase, resinification occurs, which is connected with losses, more especially if acids are used as catalysts either alone or in combination with kieselguhr. If the acid is diluted with nitrobenzene, instead of with kieselguhr, a large quantity of nitrobenzene must be used, which necessitates operating in large-sized apparatuses requiring a corresponding supply of energy and a special step for separating the nitrobenzene from the anhydride formed. Zinc in the form of foliae, wire, granules or powder has been found to be ineffective as catalyst in the production of acetic acid anhydride from liquid ethylidene diacetate. Zinc halides have been found to be efficient, however the resinification mentioned above still occurs to a certain extent and since these catalysts are liable to be decomposed, some of the decomposition products may be admixed to the anhydride formed.

In the preparation of acetic acid anhydride and acetaldehyde from ethylidene diacetate in the vapor phase, the use of pumice stone has been recommended as a promoter but it has since been found that its action is hampered by the formation of resinous products. If pumice, silicic acid etc. are combined with metal compounds having a non-basic reaction, the carrier substance is tightly enclosed by the coating of metal salts of silicic acid, phosphoric acid, boric acid etc., which forms a coherent glass-like layer, and therefore the carrier substance cannot act on the ethylidene diacetate, so that the catalytic action is merely brought about by the metal salts.

Hitherto the production of acetic acid anhydride on a commercial scale by thermic decomposition of ethylidene diacetate, as above described, was effected exclusively in the presence of substances, which are enabled by their chemical constitution to induce and further such decomposition and which are therefore endowed with an activity, as far as this reaction is concerned, which the chemist is used to term catalytic, although hitherto no explanation has been given for this particular action of these substances, which are active by virtue of their chemical character, regardless of their physical characteristics, although their activity may vary greatly in proportion to the state of subdivision in which they are put to use.

We have found that it is possible to produce acetic and other fatty acid anhydrides by the decomposition of ethylidene diacetate or the like in the vapor phase with an excellent yield and practically without any resinification, if the reaction is carried through in the presence of a silicate, such as asbestos, which, when treated with an acid, is converted into a silica skeleton, the surface of which is not fully developed. We treat the asbestos with an acid such as hydrochloric acid, which does not attack the silica skeleton. We may also use asbestos thus treated, on which is deposited a catalytically active metal, for instance platinum, which thus obtains the surface development most suitable for the reaction. For we have ascertained that the catalytic effect exerted by a catalyst does not rise in proportion to its superficial area, but that the optimum as far as the yield, the quantity of the final products, the formation of undesirable by-products etc. are concerned, is obtained with a catalyst, the surface activity of which (in the common sense) is not fully developed.

In practising our invention we may for instance proceed as follows:—

*Example 1.*—Ethylidene diacetate vapor is passed at about 320° C. in contact with a catalyst which consists of asbestos treated twenty four hours at 100° C. with concentrated hydrochloric acid and placed in a U-shaped tube. In a single passage 92% of the ethylidene diacetate are decomposed into acetic acid anhydride and acetaldehyde. On the anhydride and the aldehyde having been removed by distillation, the residue is found to consist almost exclusively of undecomposed ethylidene diacetate, which may now be subjected to the same treatment again.

*Example 2.*—Ethylidene dipropionate vapors are passed at about 300° C. in contact with a catalyst formed by extracting asbestos with an acid as described with reference to Example 1 and precipitating thereon platinum metal. In a single passage 42% of the ethylidene dipropionate were decomposed into propionic acid anhydride and aldehyde.

Various changes may be made in the details disclosed in the foregoing specification without departing from the invention or sacrificing the advantages thereof.

We claim:—

1. The method of producing fatty acid anhydrides comprising subjecting a compound of the group formed by ethylidene diacetate and the ethylidene compounds of homologous fatty acids in the vapor phase to a thermic treatment in the presence of asbestos treated about twenty four hours at about 100° C. with concentrated hydrochloric acid.

2. The method of producing fatty acid anhydrides comprising subjecting a compound of the group formed by ethylidene diacetate and the ethylidene compounds of homologous fatty acids in the vapor phase to a thermic treatment in the presence of asbestos treated with an acid.

3. The method of producing fatty acid anhydrides comprising subjecting a compound of the group formed by ethylidene diacetate and the ethylidene compounds of homologous fatty acids in the vapor phase to a thermic treatment in the presence of a silicate which has been treated with an acid to convert it into a silica skeleton.

4. The method of producing fatty acid anhydrides comprising subjecting a compound of the group formed by ethylidene diacetate and the ethylidene compounds of homologous fatty acids in the vapor phase to a thermic treatment in the presence of asbestos treated with an acid, which does not attack the silica skeleton.

5. The method of producing fatty acid anhydrides comprising subjecting a compound of the group formed by ethylidene diacetate and the ethylidene compounds of homologous fatty acids in the vapor phase to a thermic treatment in the presence of asbestos treated with hydrochloric acid.

6. The method of producing fatty acid anhydrides comprising subjecting a compound of the group formed by ethylidene diacetate and the ethylidene compounds of homologous fatty acids in the vapor phase to a thermic treatment in the presence of asbestos treated with hot hydrochloric acid.

7. The method of producing fatty acid anhydrides comprising subjecting a compound of the group formed by ethylidene diacetate and the ethylidene compounds of homologous fatty acids in the vapor phase to a thermic treatment in the presence of asbestos treated with an acid, which does not attack the silica skeleton, and having a catalytically active metal deposited on its surface.

8. The method of producing fatty acid anhydrides comprising subjecting a compound of the group formed by ethylidene diacetate and the ethylidene compounds of homologous fatty acids in the vapor phase to a thermic treatment in the presence of asbestos treated with an acid, which does not attack the silica skeleton, and having platinum deposited on its surface.

RICHARD MÜLLER.
ERICH RABALD.